W. H. MAIN.
Corn Sheller.
No. 20,650.
Patented June 22, 1858.
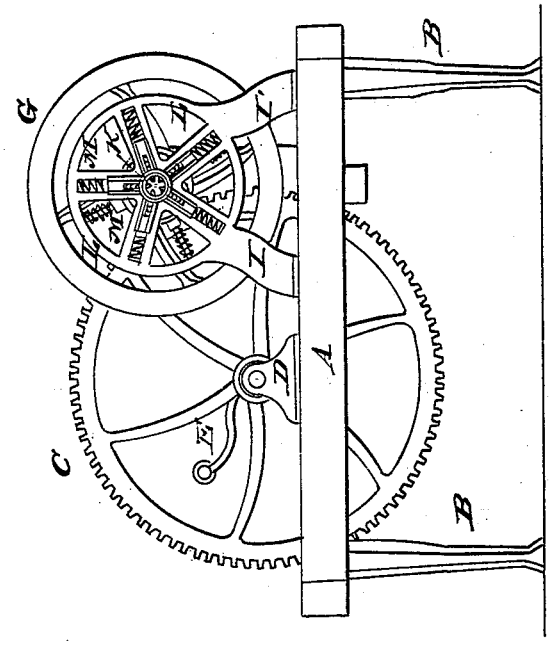
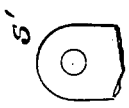
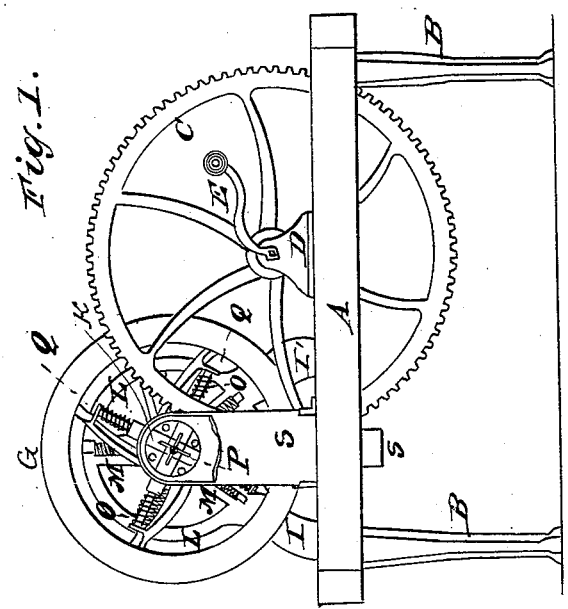
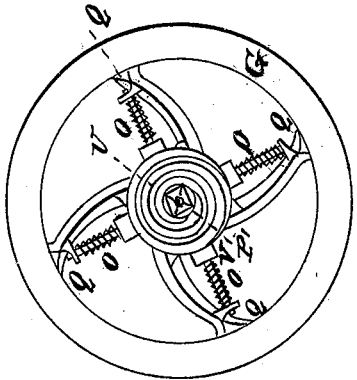
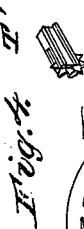
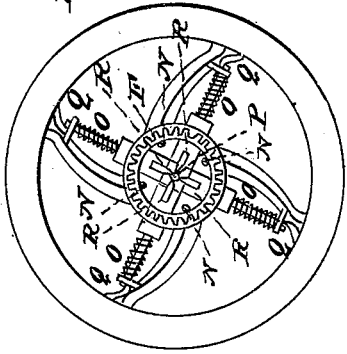

UNITED STATES PATENT OFFICE.

W. H. MAIN, OF LIVERPOOL, OHIO.

CORN-SHELLER.

Specification of Letters Patent No. 20,650, dated June 22, 1858.

*To all whom it may concern:*

Be it known that I, WILLIAM H. MAIN, of Liverpool, in the county of Medina and State of Ohio, have invented new and useful Improvements in Corn-Shellers; and I do hereby declare that the following is a full and complete description of the construction and operation of the same, reference being had to the accompanying drawings, making part of this specification, in which—

Figure 1 is a front elevation, Fig. 2 is a back side elevation, and Figs. 3, 4 and 5, sectional views.

The nature of my invention relates to the use of the balance wheel upon the revolving sheller, to the form and arrangement of the shellers, and the manner of attaching them to the arms of the balance wheel, and also to the devices for delivering the cob from the machine.

A, Figs. 1 and 2, represent the frame work of the machine, which consists of a plank, about three feet in length, and ten inches or a foot in width, and supported by four legs B.

The main, or driving wheel C is placed in a slot cut in the plank A and secured by the bearings D, which are attached to the top of the plank A by screw bolts. The shaft of this wheel is provided with a crank E, by which the machine is driven. The circumference of this wheel is armed with cogs which mesh into the pinion F Fig. 3, upon the shaft of the balance wheel G.

The balance wheel revolves upon a hollow bearing shown in detached section H, which bearing is supported by the standard I I' Figs. 2 and 4. The opening through the hub of the balance wheel, is large enough to admit the passage of the corn cobs, which must also pass through the bearing H. This bearing H is secured to the standard I by a close fit inside the collar K, and a screw K' inserted through the collar into the hole K'' in figure H. The two legs of the standard I expand into a ring seen at L in Figs. 1 and 2, seen also in section, Fig. 4, from which converge the arms M M, which arms take hold of and support the collar K in which the section H is secured. The flange H' on the end of section H, fits into a depression or seat formed in the face of the balance wheel hub, in which position it is secured by four screw bolts N passing through the pin-
ion F. The section H is held stationary by
fitting the collar K, and by the action of the screw K'. The flange H' being therefore thus situated in its seat between the hub of the balance wheel G and the pinion F, can revolve freely by the action of the driving wheel C, upon the pinion F.

The shelling jaws are four in number, and are attached to the arms of the balance wheel, as seen at O, in Figs. 1 and 3. One of these jaws is represented in detached section at O'. These jaws, when properly arranged, nearly close the opening through the hub of the balance wheel, as seen at P, Figs. 1 and 3.

The jaws are composed of a flat piece of metal, to which is attached a round stem.
This stem passes through a lip upon the arm of the balance wheel, as seen at Q. These jaws are pressed toward the center of the balance wheel by spiral springs encircling the round stem above described. The inner ends of these jaws are so formed that they shut past each other as seen at P', Fig. 5, and thus nearly close the orifice, but will open by pressure sufficiently to allow the passage of the corn cob.

The teeth R which stand at right angles to the jaws, as they revolve rapidly around the cob, effectually remove the grain from the cob, and which is delivered through the spout S.

The jaws P are so formed that they shut past each other, and as they revolve with the wheel, act upon the cob, like the nut of a screw, to draw the cob forward into the machine. They are kept pressed against the cob by the action of the spiral springs Q'.

As soon as the cob has been thus drawn in a little distance, it is seized by five spur wheels seen at T, Figs. 2 and 4. These spur wheels are attached to independent boxes or slides, seen in detached section, figure T'. These slides and their spur wheels are pressed toward the center of the axis of rotation of the balance wheel by spiral springs seen at U, Figs. 2 and 4.

The spur wheels are put in motion by the spiral cam V seen in Fig. 5, the same being attached to the back side of the hub of the balance wheel. The slides T' which move between the converging arms M M, and which form the bearings of the axis of the spur wheels, by their movement, allows the spur wheels to separate sufficiently to permit the passage of the largest sized cobs. At the same time the spiral springs U cause the slides and spur wheels to contract the orifice, so that the smallest cobs are firmly held by the spur wheels.

The manner of using this machine is as follows: The wheel C is put in motion by the crank E and this gives a rapid motion to the balance wheel G and the jaws P. The ears of corn are inserted into the jaws through the opening W in the front plate of the spout S, (the upper portion of this plate is shown in section S', this section being removed for the purpose of showing the jaws and teeth of the sheller) when it is caught and drawn in by the screw action of the jaws, (the corn being stripped off the cob by the teeth.) The cob is then caught by the spur wheels, the converging points of which are moved outward by the action of the spiral cam V, and thus the naked cob is delivered from the machine.

What I claim as my improvement and desire to secure by Letters Patent, is—

1. The use of the balance wheel G, in combination with the open hub, jaws P, teeth R and springs O, when arranged in the manner substantially as set forth.

2. I also claim a series of spur wheels T arranged with spiral springs and slides, or their equivalents, as described, and in combination therewith, the spiral cam V by which the spur wheels are driven, when constructed and operated in the manner and for the purpose specified.

WILLIAM H. MAIN.

Witnesses:
DELAGON E. HAINES,
JAMES H. HAINES.